United States Patent [19]
Trisler

[11] Patent Number: 5,974,986
[45] Date of Patent: Nov. 2, 1999

[54] INTER-PLANT ARM APPARATUS

[76] Inventor: John Tyler Trisler, 3746 E. 800 North Rd., Fairmount, Ill. 61841

[21] Appl. No.: 08/961,995

[22] Filed: Oct. 31, 1997

[51] Int. Cl.[6] .................................................. A01B 11/00
[52] U.S. Cl. .............................................. 111/69; 111/200
[58] Field of Search ....................... 111/69, 200

[56] References Cited

U.S. PATENT DOCUMENTS 4,467,875   8/1984   Lewison ................................. 172/776

OTHER PUBLICATIONS

1996 Price Sheet, "Inter–Plant Brackets", Wetherell Mfg. Co., Cleghorn, Iowa.

*Primary Examiner*—Christopher J. Novosad
*Attorney, Agent, or Firm*—Fitch, Even, Tabin & Flannery

[57] ABSTRACT

There is provided an inter-plant arm assembly for selectively mounting a predetermined number of additional planter units to a multi-row planter having a plurality of existing planter units. The inter-plant arm facilitates quick and efficient varying of row widths to plant different crops. The inter-plant arm includes a front arm that attaches to the planter adjacent an existing planter unit and extends at a predetermined angle of incline and a rear arm that carries at least one additional planter unit. A coupling between the front and rear arms allows for quick attachment and detachment of any desired additional planter units. The coupling defines a receiver that accepts an end portion of the rear arm and includes a pin and lock to selectively secure that end portion of the rear arm in the receiver. The front and rear arms include a plurality of bends to position the coupling above the connection between the front arm and the planter and the connection between the second arm and the desired additional planter units.

24 Claims, 8 Drawing Sheets

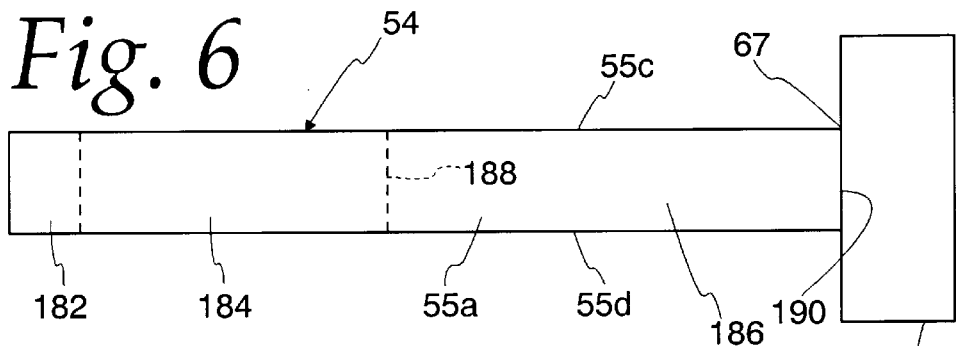
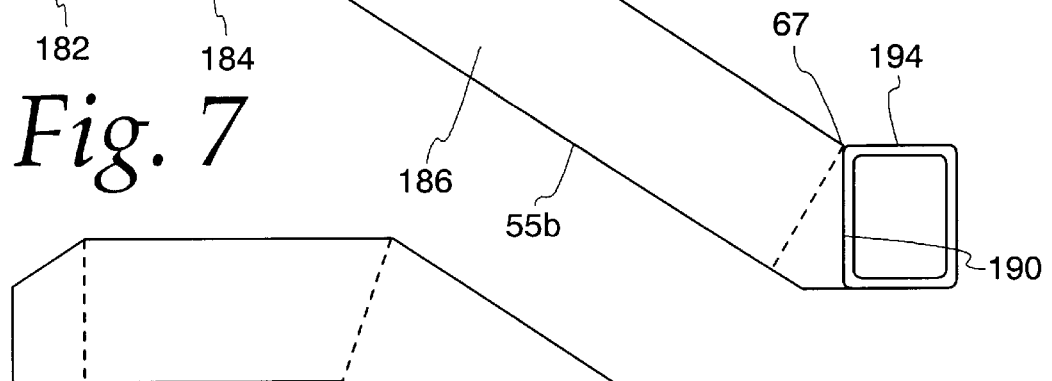
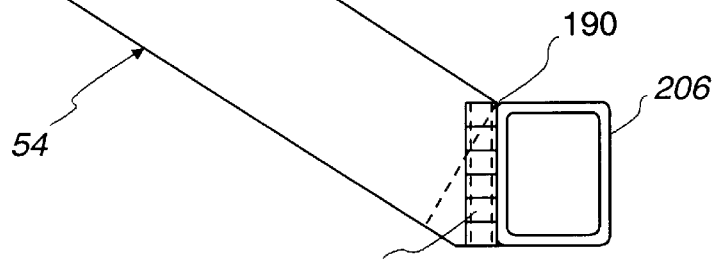
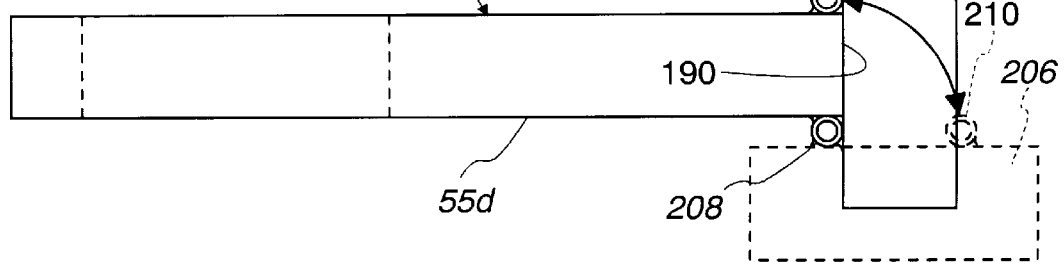

INTER-PLANT ARM APPARATUS

FIELD OF THE INVENTION

The present invention relates to agricultural planting in multiple rows and, more particularly, to facilitate efficient varying of row widths between the multiple rows to accommodate planting of different crops.

BACKGROUND OF THE INVENTION

In agricultural planting, it has been found that crop rotation increases the ability to produce maximum crop yield. A corn and soybean rotation has been found to be one of the most common and profitable crop rotations. It also has been determined that the row spacing for maximum profit per acre is different for these two crops. Soybean crops produce better yield when planted in narrower rows than corn crops. For instance, the recommended and most commonly used row spacing for soybean crops is in the range of about 10 to 15 inches and the range for corn crops is about 30 to 36 inches. Moreover, not only is soybean yield increased through narrower rows, but weed control costs also are reduced because narrower rows are found to canopy much quicker than wider rows. Thus, it is very important that crops be planted in rows utilizing the known spacing for that particular crop to produce maximum yield.

Due to the known yield benefits from different row spacing between rotational crops, coupled with the high costs associated with farm implements, farmers typically are faced with a serious problem when deciding which type of implement to purchase for rotational type planting. One known solution has been to simply purchase separate equipment for each type of crop. For instance, one would purchase a conventional planter adapted for corn planting and another drill type planter adapted specifically for planting soybean crops in narrower rows. For most farmers, this is an undesirable option. Not only is this solution expensive in that it requires purchasing of two separate implements, experience has revealed that drill type planters do not populate planting as accurately as the typical conventional planter units. Thus, it commonly is preferred to use a conventional planter for planting both corn and soybean crops.

Some available planters, such as the 7100 John Deere planter, are capable of being mounted with additional planter units between the existing units to effectively reduce the row width by one half. More specifically, to plant narrower row crops, additional planter units can be mounted directly to the main tool bar in between the existing units because this space is unobstructed so to provide direct access directly to the main tool bar of the planter. For instance, a 10 unit planter set for 36-inch rows for corn crop planting could be converted in this manner to a 19 unit planter with reduced 18-inch rows by inter-mounting additional planter units for soybean crop planting. While this does not meet the desired spacing of 10 to 15 inches between rows, it has been an acceptable solution.

With other larger planters, such as the John Deere 7000 front fold planter, mounting of additional planter units between the existing units is not a viable option because this space is occupied with lift wheel assemblies for raising and lowering the planter. More specifically, a number of lift assemblies occupy the space between a number of the existing planter units and include components that extend above the main tool bar. As a result of these lift wheel assemblies, it is impossible to mount additional planter units directly to the main tool bar.

One known device directed to accommodate for planter lift wheel assemblies is a product referred to as the Wetherell Inter-Plant Bracket by Wetherell Mfg. Co. The Wetherell bracket consists primarily of a two member bracket system in which one member mounts directly to the main tool bar at the existing planter unit and angles into to the space between that planter unit and an adjacent existing planter unit and the second member connects to the first and carries an additional planter unit. In addition to angling laterally in between the existing planter units, the bracket also rises up and over the lift wheel assembly.

While the Wetherell device accomplishes providing additional planter units on planters with lift wheel assemblies between the existing planter units, a known shortcoming is the tendency to place increased stress on the bracket due to its angled reach between existing planter units. Accordingly, the bracket is made heavy and cumbersome to provide the necessary durability to support the additional planter unit during planting.

An additional shortcoming is that the two members of the bracket are joined with a number of bolts and, therefore, do not facilitate quick attachment and detachment of an additional planter unit for converting between wide and narrow row spacing. Experience has revealed that the time necessary to attach and detach the second member carrying the additional planter unit is unduly increased due to the bolt attachment. In fact, it has been found that to efficiently mount the planter unit with the Wetherell bracket it often takes more than one person to locate the planter unit, align the second bracket member with the first member and install and tighten the bolts. Moreover, since the Wetherell bracket is an angling bracket system, there is the need for brackets angling to the right and to the left for most conventional planters to narrow row spacing.

Thus, there is a desire for a more sturdy and reliable system for converting a multi-row planter quickly and easily between wide and narrow row spacing to facilitate efficient and effective crop rotation. The design must be capable of accommodating lift wheel assemblies and be sufficiently durable to withstand the rough terrain of typical fields. It also must be reliable to ensure accurate planting. Moreover, many planters include a number of planter units carried by wings that fold forward and inward for transport. The system also must be capable of mounting additional units to these wings in a manner that does not drastically increase the transport width.

SUMMARY OF THE INVENTION

The present invention provides a quick connect and disconnect coupling for adding additional planter units to a multi-row planter. The coupling includes a receiver tube in which is inserted a telescoping tube. The tubes have engaged walls to prevent rotation of at least one additional planter unit attached to a multi-row planter by the coupling. The coupling also includes a coupling device that transmits pulling forces from a multi-row planter to at least one additional planter unit.

The coupling device also may include a pin interconnecting the tubes to transmit pulling forces from a multi-row planter to at least one additional planter unit. The receiver tube may also have a cover removable to a receiving position to allow insertion of the telescoping tube into the receiver tube. In the receiving position, the cover may also expose the coupling device to allow insertion of the telescoping tube into the receiver tube. The cover may even be pivotally mounted to the receiver tube to pivot open to the receiving position to expose the coupling device to allow insertion of the telescoping tube into the receiver tube and to pivot closed to a lock position to prevent removal of the telescoping tube from the receiver tube with the coupling device.

In another embodiment, the present invention provides a bracket assembly for facilitating efficient varying of planting row widths in a multi-row planter having a plurality of existing planter units by selectively mounting a predetermined number of additional planter units. The bracket assembly includes a first arm having a first end capable of being mounted to a multi-row planter adjacent an existing planter unit and a second end opposite the first end and a second arm having a first end for carrying at least one additional planter unit and a second end for connection to the second end of the first arm.

The bracket assembly also includes a coupling to selectively connect and disconnect the second ends of the first and second arms. The coupling is carried by one of the second ends of the first and second arms and defines a receiver for receiving the other of the second ends of the first and second arms. Further, the coupling includes a lock selectively shiftable between a lock position in which the other of the second ends of the first and second arms is secured in the receiver and an unlock position in which the other of the second ends of the first and second arms is free to be removed from the receiver.

The lock also may include a pin selectively extending between the receiver and the other of the second ends of the first and second arms to prevent release from the receiver when the lock is in the lock position. The pin also is selectively removable from the other of the second ends of first and second arms to release the other of the second ends of the first and second arms from the receiver when the lock is in the unlock position. Even further, the lock may include a latch selectively shiftable between a closed position and an open position. In the closed position, the latch defines in part the receiver and prevents the pin from being removed from the other of the second ends of the first and second arms when the lock is in the lock position. In the open position, the pin is selectively removable from the other of the second ends of the first and second arms to release the other of the second ends of the first and second arms from the receiver when the lock is in the unlock position.

The first end of the first arm may be capable of being mounted to a multi-row planter at a predetermined angle of incline to locate the second end of the first arm above the first end of the first arm and to locate the coupling between the second ends of the first and second arms above the first end of the first arm. The coupling also may be carried by the second end of the first arm and the receiver would be adapted to accept the second end of the second arm to connect the first and second arms.

Further, the first arm may include a left arm member and a right arm member that merge together to form in part the receiver of the coupling. Furthermore, the left and right arm members of the first arm may have a plurality of bends to merge the arm members together at the coupling and to alter the predetermined angle of incline of the first member for the coupling.

The coupling may include a base extending between the left and right arm members to define in part the receiver along with the left and right arm members at the coupling. The latch of the lock also may include a cover extending between the left and right arm members to define in part the receiver along with the base and the left and right arm members at the coupling. The cover may be pivotally mounted to the left and right arm members to be selectively pivoted between the closed position of the latch to prevent the second end of the second arm from releasing from the receiver when the lock is in the lock position and to the opened position of the latch to allow the second end of the second arm to be removed from the receiver when the lock is in the unlock position.

The pin may extend from the base into the receiver and the second end of the second arm would define a pin aperture to receive the pin when the second end is located in the receiver. The cover in the open position of the latch may allow the second end of the second arm to be located in the receiver so that the pin inserts in the pin aperture, and in the closed position of the latch, the lock prevents the cover from being pivoted to prevent the second end of the second arm from disengaging the pin and releasing from the receiver.

Furthermore, the first end of the second arm may include a mounting member to attach at least one additional planter unit. The mounting member may include a hinge mount with the second end of the second arm to allow the mounting member to pivot between a planting position and a transport position.

In an even further embodiment, the present invention is directed to a bracket assembly for facilitating efficient varying of planting row widths in a multi-row planter having a plurality of existing planter units by selectively mounting a plurality of additional planter units. The bracket assembly includes a plurality of first arms each having a first end capable of being mounted to a multi-row planter adjacent an existing planter unit and a second end opposite the first end. The bracket assembly also includes a tool bar capable of carrying a plurality of additional planter units and a plurality of second arms each having a first end for attachment to the tool bar and a second end for selective connection to the second end of the first arms. A plurality of couplings selectively connect and disconnect the second ends of the first and second arms. The couplings are carried by the second end of each of the first arms and define a receiver for each receiving one of the second ends of the second arms. Each of the couplings has a lock selectively shiftable between a lock position in which the second ends of the second arms are secured in the receivers and an unlock position in which the second ends of the second arms are free to be removed from the receivers.

The tool bar may include a first bar and a second bar and a hinge pivotally connecting the first and second bars. The first bar would be attached to the first ends of the second arms and the second bar would carry a plurality of additional planter units. The second bar is pivotable between a planting position along the first bar and a transport position spaced from the first bar.

Each of the first arms may include a left arm member and a right arm member that merge together to form in part the receiver at each of the couplings. Each of the couplings may include a base extending between the left and right arm members to define in part the receiver along with the left and right arm members at the coupling.

Each of the locks also may include a cover extending between each of the left and right arm members to define in part the receiver along with the base and left and right arm members at each of the couplings. The cover is pivotally mounted to the left and right arm members to be selectively pivoted between a closed position and opened position. In the closed position, the second end of the second arm is prevented from releasing from the receiver when the lock is in the lock position. In the opened position, the second end of the second arm is allowed to be removed from the receiver when the lock is in the unlock position. The lock also may include a latch to secure the cover in the closed position when the lock is in the lock position.

DETAILED DESCRIPTION OF THE DRAWINGS

The present invention will be described in connection with the accompanying drawings wherein:

FIG. 6 is a top plan view of the rear arm of the inter-plant arm of FIG. 3;

FIG. 7 is a side elevational view of the rear arm of FIG. 6;

FIG. 8 is a side elevational view of an alternative rear arm of an inter-plant arm embodying features of the present invention to illustrate a pivotal mount for an individual additional planter unit;

FIG. 9 is a top plan view of the alternative rear arm of FIG. 8 to illustrate operation of the pivotal mount;

Figure 12:
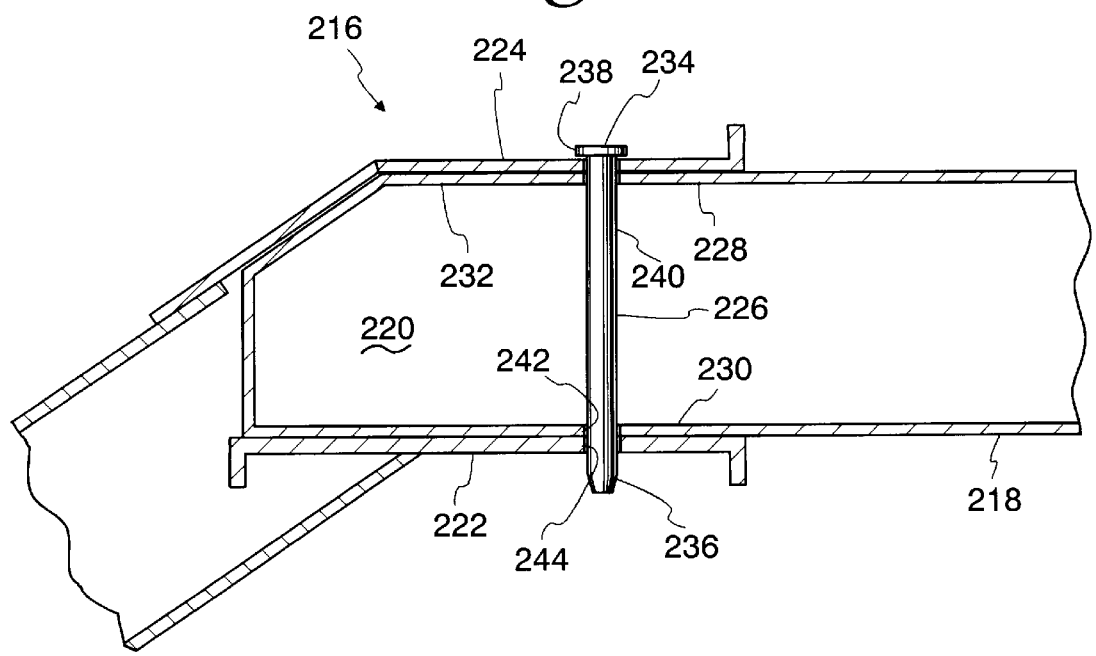
Figure 13:
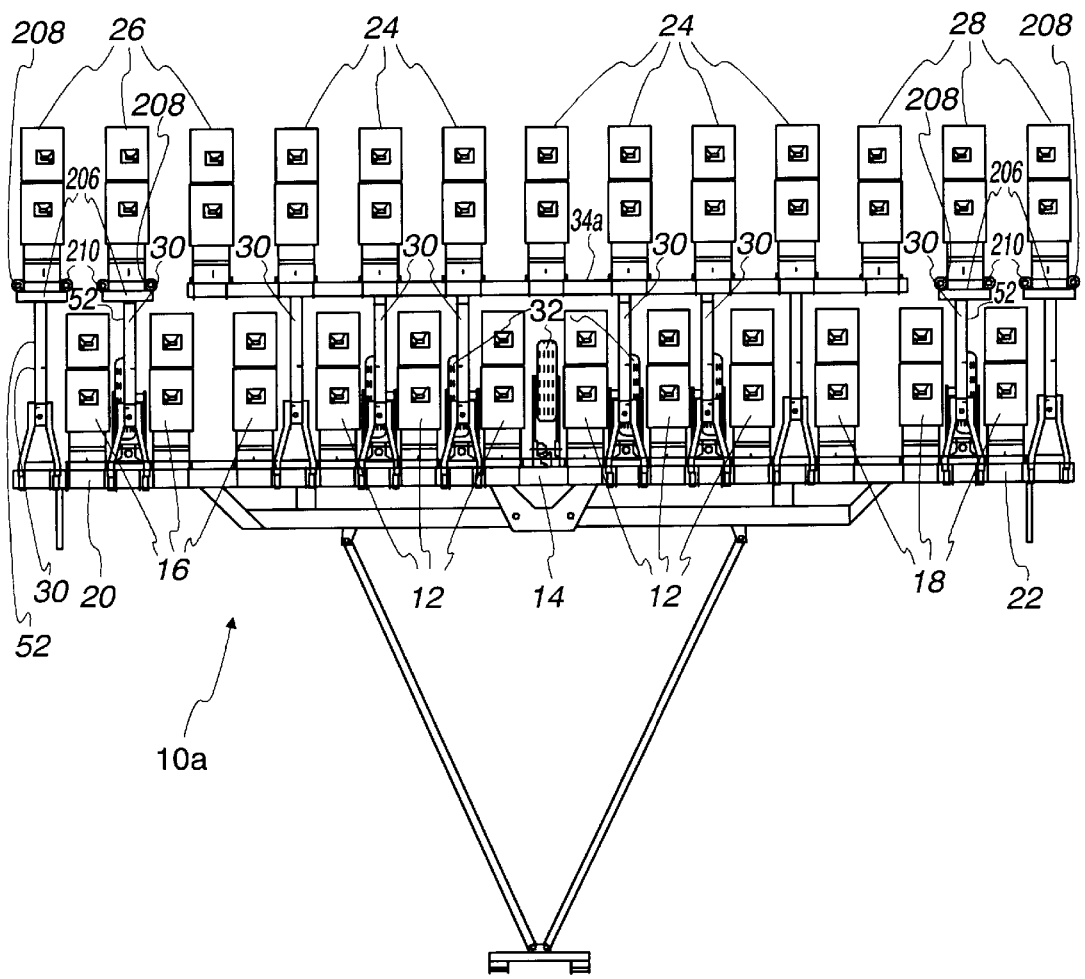

FIG. 12 is a cross-sectional view of a portion of alternative front and rear arms of an inter-plant arm embodying features of the present invention to illustrate an alternative coupling between the front and rear arms; and FIG. 13 a top plan view of a multi-row planter in the planting configuration and including an alternative arrangement of inter-plant arms embodying features of the present invention to illustrate mounting of additional planter units.

DETAILED DESCRIPTION OF THE PREFERRED EMBODIMENT

Figure 1:
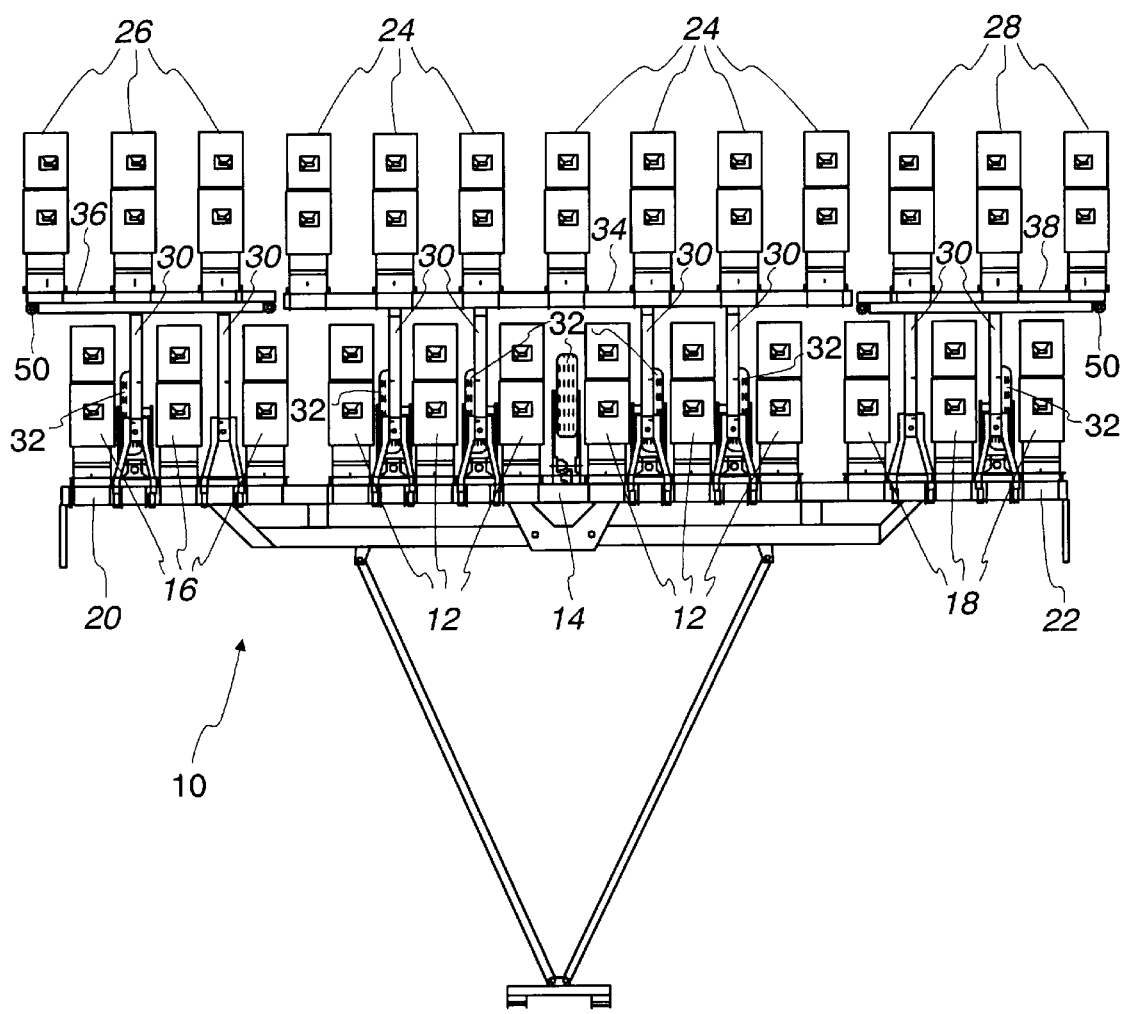
FIG. 1 is a top plan view of a multi-row planter in the planting configuration and including inter-plant arms embodying features of the present invention mounting additional planter units.

Referring to FIG. 1, there is illustrated a tractor drawn multi-row planter 10 for use to efficiently and effectively plant crops in multiple rows in vast fields. As shown, the planter 10 includes six existing planter units 12 mounted directly to a main tool bar 14 and three units 16 and 18 mounted on each side of the main tool bar 14 directly to left and right wing tool bars 20 and 22, respectively. The twelve existing planter units 12, 16 and 18 are identical and positioned along the tool bars 14, 20 and 22 for planting equally spaced rows. For instance, the planter units may be spaced approximately 30 to 36 inches apart for crops providing better yields when planted in wide rows, such as corn crops.

For planting crops performing better in narrower rows, such as soybean crops, a number of additional planter units 24, 26 and 28 are mounted for inter-planting between the existing planter units 12, 16 and 18. The additional planter units 24, 26 and 28 increase the number of rows and reduce the spacing between each row. As illustrated, a twelve row planter may be converted to a 25 row planter with narrower row spacing, such as about 10–18 inches for planting soybean crops.

Figure 3:
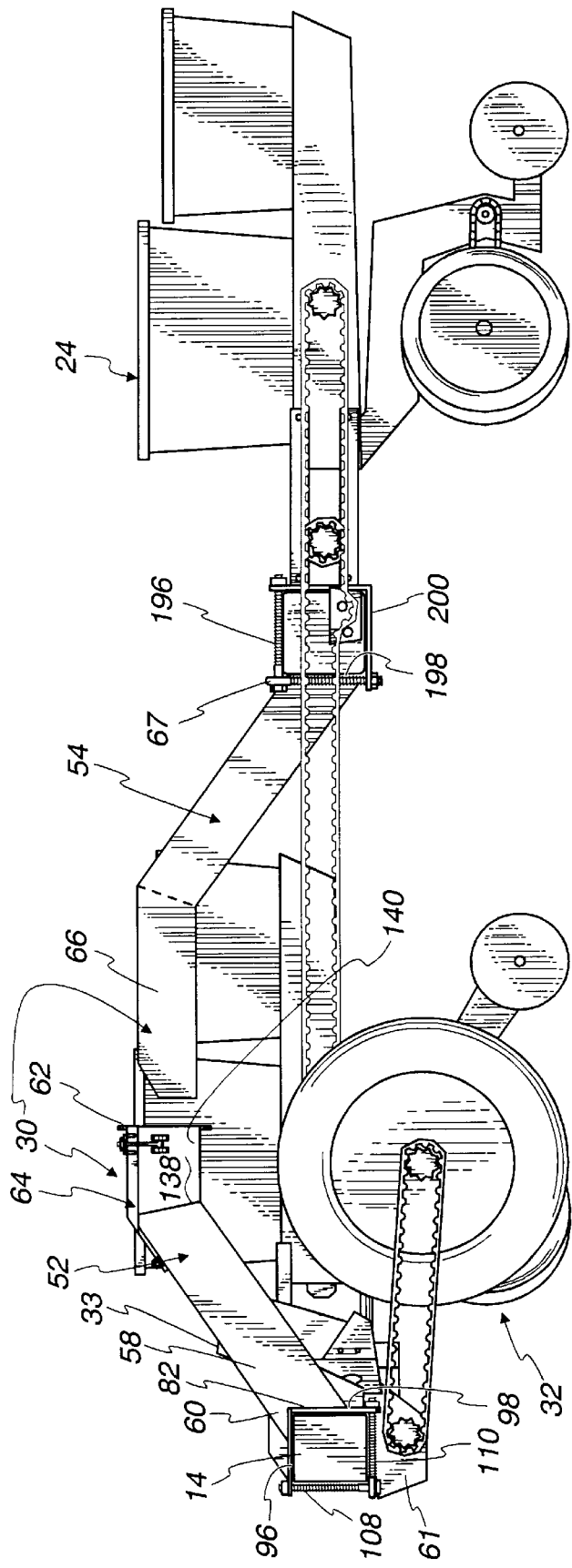
FIG. 3 is a side elevational view of an inter-plant arm embodying features of the present invention to illustrate a front arm attached to the planter and a rear arm carrying an individual additional planter unit.

Referring to FIGS. 1 and 3, the additional planters 24, 26 and 28 are mounted to the planter 10 using a number of inter-plant arms 30 embodying features of the present invention. The inter-plant arms 30 mount directly to the 14 main tool bar of the planter 10 between existing planter units 12 and, in wider planters, also to the right and left wing tool bars 20 and 22 between existing planter units 16 and 18. The inter-plant arms 30 are attached to the tool bars 14, 20 and 22 in a manner that avoids a planter unit drive shaft (not shown) located underneath the tool bars 14, 20 and 22. The inter-plant arms 30 essentially extend backward from the tool bars 14, 20 and 22 between existing planter units 12, 16 and 18 and arch upward over any lift wheels assemblies 32 and avoid a lift wheel drone hydraulic cylinder 33 (FIG. 3) that extends above the tool bars 14, 20 and 22. After clearing the lift wheel assembly 32, each inter-plant arm 30 arches back down to the same general vertical height of the tool bars 14, 20 and 22 to mount the additional planter units 24, 26 and 28. This enables the same type of planter unit to be used for both existing units and the additional planter units.

Figure 11:
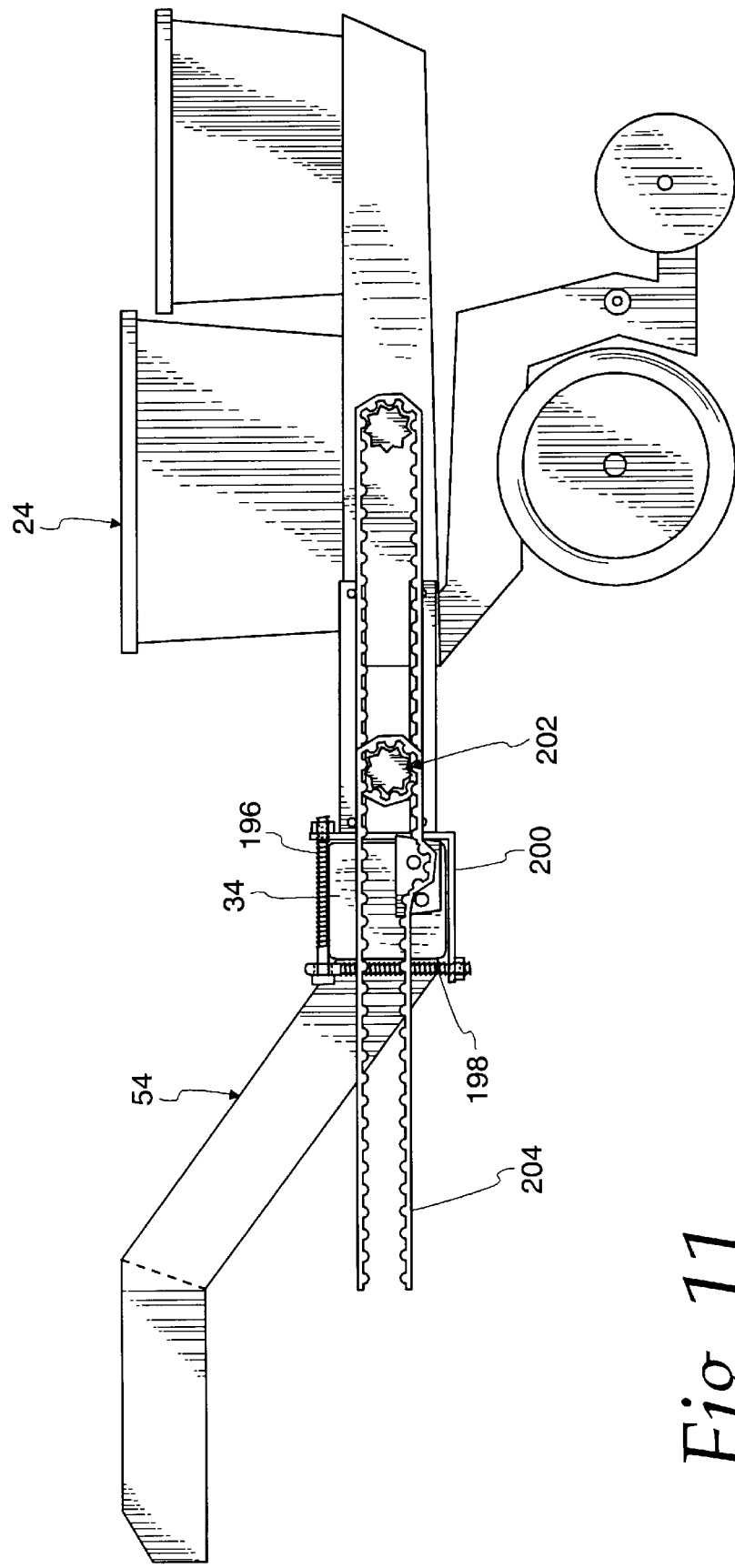
FIG. 11 is a side elevational view of a rear arm of the inter-plant arm of FIG. 1 to illustrate mounting an additional tool bar.

The inter-plant arms 30 may mount an individual additional planter unit 24 (FIG. 3) or may mount an additional tool bar, such as an additional main tool bar 34 and additional left and right wing tool bars 36 and 38 for supporting sets of additional planter units 24, 26 and 28 (FIGS. 1 and 11). As illustrated, an advantage of the additional tool bars is that they can support more than one additional planter unit per inter-plant arm.

Figure 2:
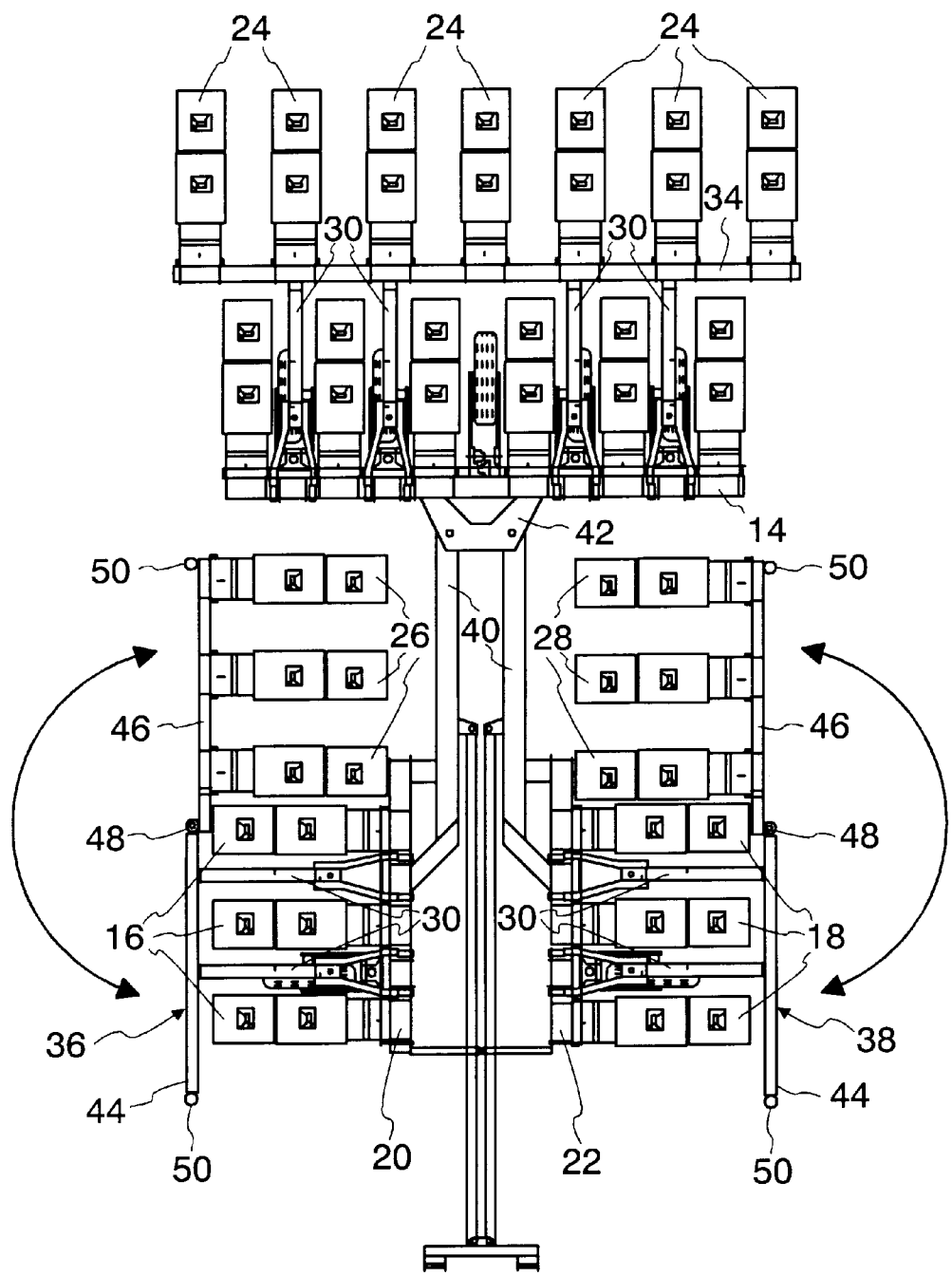
FIG. 2 is a top plan view of the planter of FIG. 1 in the transport configuration.

Referring to FIG. 2, the multi-row planter 10 is illustrated in the transport configuration with the right and left wing tool bars 20 and 22 shifted forward and inward by a pair of swing arms 40 pivotably mounted with a V-shaped bracket 42 to the main tool bar 14 at a generally central location. To maintain the desired transport width, which is preferably in the range of approximately 15 to 17 feet, the additional planter units 26 and 28 mounted at the wings 20 and 22, respectively, also are pivotable to position them along side the existing planter units 16 and 18.

As illustrated, the additional wing tool bars 36 and 38 each consist of a fixed bar 44 and a swing bar 46 that are mounted together at one end with a hinge 48. At the other ends, the bars 44 and 46 are held together with a latch 50 for planting (FIG. 1). To shift the additional planter units 26 and 28, the swing bar 46 is unlatched from its parallel position with the fixed bar 44 (FIG. 1) and pivoted about the hinge 48 to swing the additional planter units 26 and 28 into transport position between the main tool bar 14 and the left and right existing planter units 16 and 18, respectively.

Referring to FIG. 3, each of the inter-plant arms 30 includes a front arm 52 designed to remain attached to any one of the planter tool bars 14, 20 and 22 (FIG. 4), and a rear arm 54 designed to carry either an individual additional planter unit 24 or the additional tool bars 34, 36 and 38 for multiple additional planter units 24, 26 and 28 (FIGS. 1 and 11). The front and rear arms 52 and 54 are easily connected and disconnected to attach and detach additional planter units to alter the row width to efficiently convert the planter 10 between wide and narrow row crop planting. While the desired overall length of the inter-plant arms should be as short as possible to enhance control of the planter, it is preferred that the additional planter units be spaced at least a sufficient distance back from the tool bars 14, 20 and 22 to allow easy access to the existing units for loading.

Figure 4:
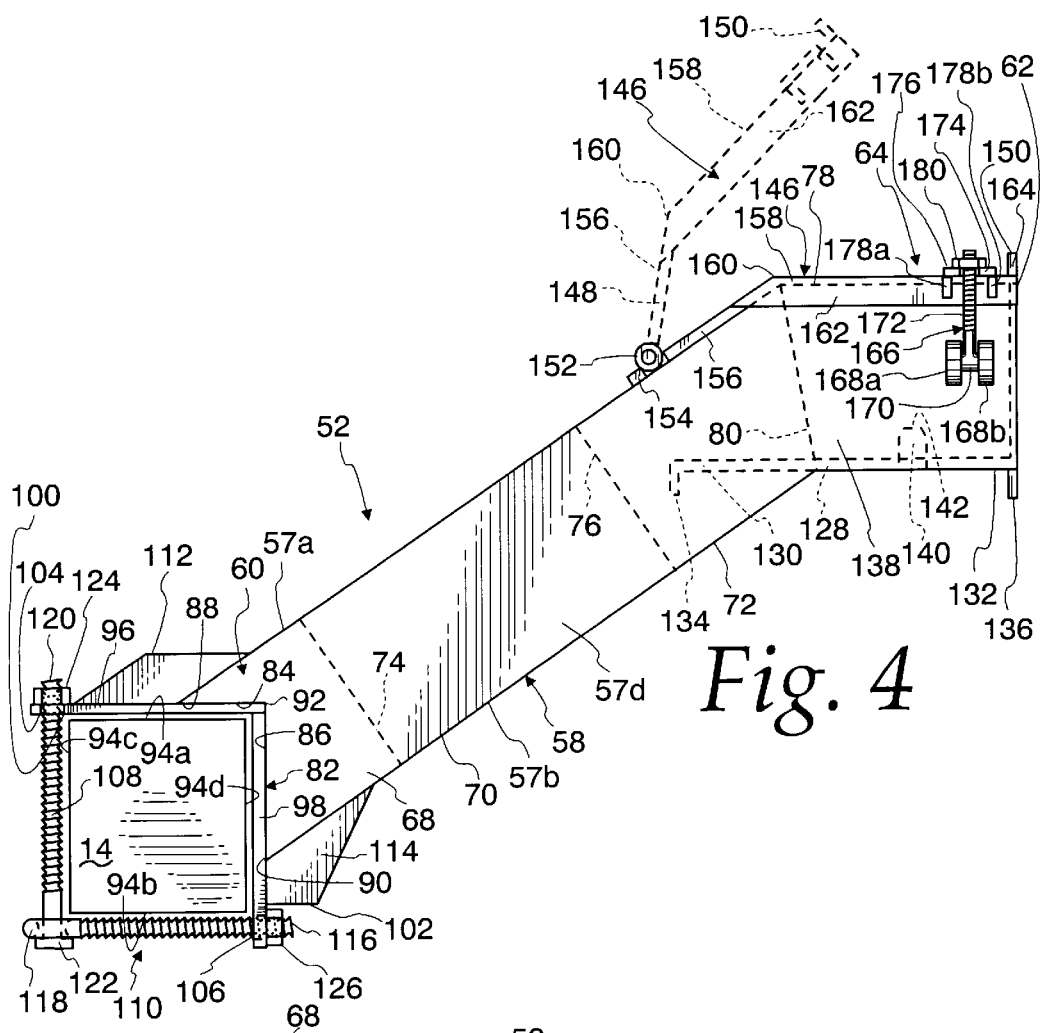
FIG. 4 is a side elevational view of the front arm of FIG. 3 to illustrate mounting to the planter and a coupling for connection with the rear arm of FIG. 3.
Figure 5:
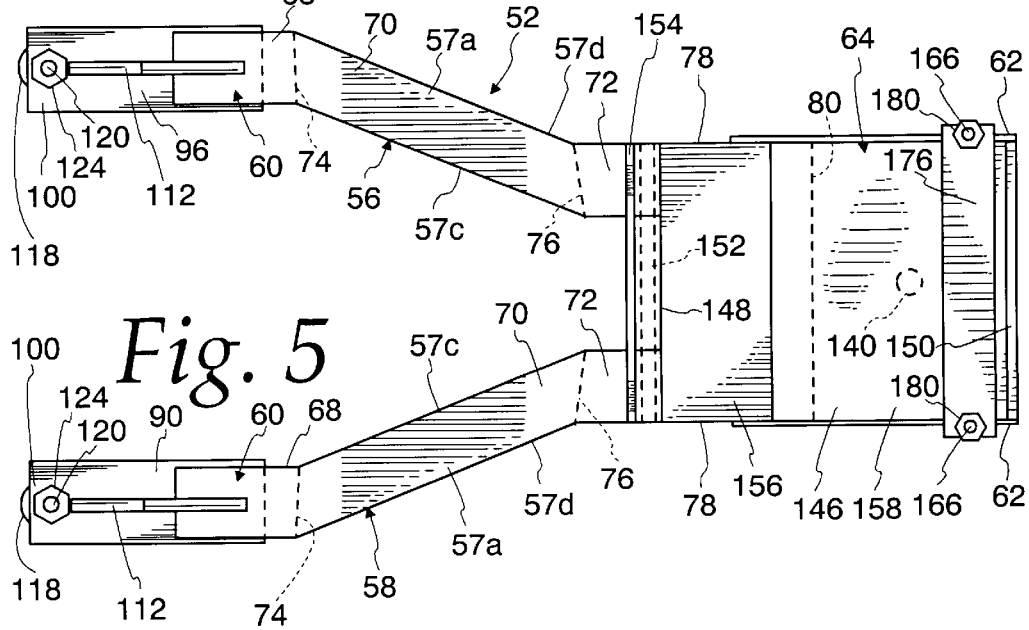
FIG. 5 is a top plan view of the front arm of FIG. 4.

Referring to FIGS. 3, 4 and 5, each front arm 52 has a generally wishbone configuration that is formed from left and right members 56 and 58 to open toward the tool bar, such as the main tool bar 14 and the wing tool bars 20 and 22, of the planter 10 when installed. Each of the right and left members 56 and 58 include a mounting end 60 adapted to attach the front arm 52 to the tool bar 14 and a receiver end 62 opposite the mounting end 60 designed to cooperate with a coupling 64 to receive the rear arm 54. The coupling 64 is designed to engage and lock an insert end portion 66 of the rear arm 54 between the receiver ends 62 of the front arm members 56 and 58 and, reversely, to unlock and disengage with the rear arm 54 to quickly and easily switch between narrow and wide row planting.

To provide adequate strength to support the rear arm 54 properly, the right and left members 56 and 58 of the front arm 52 are tubular with a rectangular cross-section defined by a top side 57*a*, a bottom side 57*b*, an inner side 57*c* and an outer side 57*d*, respectively. For instance, the preferred right and left members may be made from tubular steel with cross-section dimensions of approximately 2±0.2 inches× 6±0.2 inches×0.25±0.05 inch.

The spacing between the mounting ends 60 is designed to allow the front arm 52 to straddle a lift wheel mounting bracket 61 used to mount the lift wheel assembly 32 to the tool bars 14, 20 and 22. Thus, the lift wheel mounting bracket, along with the hydraulic cylinder 33, is located between the inner sides 57*c* of the right and left members 56 and 58 at the mounting ends 60. For instance, the preferred spacing for use with most planters is about 10 to 12 inches.

The left and right members 56 and 58 merge together to space the receiver ends 62 closer together than the mounting ends 60. The spacing between the receiver ends 62 is designed to hold the insert end portion 66 of the rear arm 54 between the inner sides 57*c* of the left and right members 56 and 58 at the receiver ends 62. While the spacing includes sufficient clearance between the insert end portion 66 of the rear arm 54 and the inner sides 57*c* at the receiver ends 62 to allow the insert end portion 66 to side freely into position, such clearance also must be minimized in order to limit most lateral movement or wobble to ensure accurate row alignment during planting.

Referring to FIGS. 6 and 7, the rear arm 54 is tubular with a rectangular cross-section defined by a top side 55*a*, a bottom side 55*b*, and a pair of outer sides 55*c* and 55*d*. Opposite the insert end portion 66, the rear arm 54 includes a support end 67 designed to carry either an individual additional planter unit (FIG. 3) or support one of the additional tool bars 36, 34 and 38 (FIGS. 1 and 11). With respect to the receiver ends of the front arm, the preferred minimum spacing between the inner sides of the arm members 56 and 58 is in the approximate range of about 4.25±1.0 inches for a rear arm having a rectangular cross section dimensions of approximately 4 inches×6 inches×0.25 inch.

Referring to FIGS. 3, 4 and 5, between the mounting and receiver ends 60 and 62, each of the left and right members 56 and 58 is segmented into a first, second, third and fourth segment 68, 70, 72 and 78, respectively. The first, second and third segments 68, 70 and 72 are separated by a first and second lateral bend 74 and 76 to form the lateral merge between the left and right members 56 and 58 toward the receiver ends 62. The third segment 72 and the fourth segment 78 are separated by a vertical bend 80 that alters the vertical direction of the front arm 52 after it has cleared the lift wheel assembly 32.

The front ends 60 of the front arm members 56 and 58 are designed to mount the front arm 52 at an incline from the tool bar 14. In effect, the front ends 60 set the first, second and third segments 68, 70 and 72 of the front arm members 56 and 58 at a predetermined angle of incline that raises the front arm 52 up to clear the lift wheel assembly 32.

Referring to FIGS. 3, 4 and 5, each front end 60 includes an identical off center V-shaped notch 82 formed in each of the inner sides 57*c* and the outer sides 57*d* of each front arm member 56 and 58. Each notch 82 opens toward one of the tool bars 14, 20 and 22 of the planter 10, such as main tool 14 for illustration, and is defined by a first longitudinal edge 84 and a second longitudinal edge 86. The first and second edges 84 and 86 each include a distal end edge 88 and 90, respectively, and a common corner segment 92. The first and second edges 84 and 86 extend from the corner segment 92 at a predetermined angle relative to one another and differ in length.

The tool bars 14, 20 and 22, such as tool bar 14 for illustration, are tubular with a generally square cross-section also defined by a top side 94*a*, a bottom side 94*b*, a front side 94*c* and a rear side 94*d*. When the front arm members 56 and 58 are installed on the tool bar 14, the first edge 84 runs parallel with the top side 94*a* of the tool bar 14, and the second edge 86 runs parallel with the rear side 94*d* of the tool bar 14. The predetermined angle between, and the lengths of, the first and second edges 84 and 86 depend on the desired angle of incline for the front arm 52. To set the incline angle to less than 45°, the corner segment 92 is located closer to the top side 57*a* than the bottom side 57*b* of the arm members 56 and 58.

For instance, to set the incline angle at the preferred angle of 30±1.0°, the predetermined angle between the first and second edges of each notch is approximately 9±2° to match the tool bar for secure mounting. Accordingly, the preferred length of the first edge of each notch is about 3.05±0.1 inch, and the preferred length of the second edge of each notch is about 5.2±0.1 inch. The corner segment adjoining the first and second edges is spaced a perpendicular distance from the top side of about 1.75±0.1 inch, and to accommodate this location, the length of the top side of the first segment is approximately 0.5±0.05 inch shorter than the bottom side.

First and second rectangular mounting plates 96 and 98 are affixed along the first and second edges 84 and 86 of the notches 82 of the left and right arms 56 and 58, respectively, and span across the space in between the sides 57*c* and 57*d* of each arm 56 and 58 at the notch 82. The mounting plates 96 and 98 each have an inner end that meets at the common corner segment 92 and an opposite outer end 100 and 102, respectively. The outer end 100 and 102 of each plate 96 and 98 includes a bore 104 and 106, respectively, designed to cooperate with a straight bolt 108 and an eye bolt 110 to secure the arm members 56 and 58 to the tool bar 14. The first plate 96 engages the top side 94*a* of the tool bar 14, and the second plate 98 engages the rear side 94*d* of the tool bar 14. The first and second plates 96 and 98 extend beyond the distal ends 88 and 90 of the first and second edges 84 and 86 and the top side 94*a* and the rear side 94*d* of the tool bar 14.

There is a first web reinforcement plate 112 that extends between the first mounting plate 96 and the top side 57*a* of each arm member 56 and 58 and a second web reinforcement plate 114 that extends between the second mounting plate 98 and the bottom side 57*b* of each arm member 56 and 58. The mounting plates may be affixed to the first and second edges by any suitable manner, such as a weld, and reinforcement plates also may be fixed by any suitable means, such as a weld.

For mounting each arm member 56 and 58, the eye bolt 110 has an eyelet 118 at one end and a threaded portion 116 at the other end. The threaded portion 116 extends through the bore 106 at the outer end 102 of the second mounting plate 98. The eye bolt 110 extends along the bottom side 94b of the tool bar 14, and the straight bolt 108 extends through the eyelet 118 and along the front side 94c of tool bar 14. A threaded portion 120 of the straight bolt 108 extends through the bore 104 in the outer end 100 of the first mounting plate 96. The bolts interconnect through a head portion 122 on the straight bolt 108 abutting against the eyelet 118 of the eye bolt 110. The bolts 108 and 110 are secured with nuts 124 and 126 that are tightened to clamp the mounting end 60 of the front arm members 56 and 58 to the tool bar 14. As a result, the first and second mounting plates 96 and 98 and the bolts 108 and 110 completely surround the tool bar 14 at each notch 82 and mount the front arm 52 securely to the tool bar 14 without allowing any rotational slipping.

The first segments 68 of the arm members 56 and 58 extend parallel to one another and perpendicular from the tool bar 14 at the predetermined angle of incline. The second segments 70 of the arm members 56 and 58 also extend at the predetermined angle of incline but are merged together by way of the first bend 74 of the arm members 56 and 58 at a predetermined first lateral angle. The length of the second segments 70 is coordinated with the predetermined angle of the first bend 74 to set the desired spacing between the receiver ends 62 of the arm members 62. For instance, the preferred predetermined angle for the first bend of each arm member is about 75±1.0° taken from a reference line at the first bend and parallel to the tool bar, and to set a spacing of about 4.25±0.1 inch, the second segments have a longitudinal center length of about 12.7±0.1 inch.

The third segment 72 of each arm member 56 and 58 also extends at the predetermined angle of incline, and the second bend 76 of each arm member 56 and 58 returns the direction of the arm member 56 and 58 to be approximately perpendicular with respect to a reference line parallel to the tool bar 14 at the second bend 76. At this setting, the third segments 72 of the arm members 56 and 58 are generally parallel and set at the same desired spacing for the receiver ends 62. For example, the preferred predetermined angle at the second bend is about 15.5±1° taken with reference to the lateral longitudinal direction of the second segment, and the preferred length of each third segment is in the approximate range of about 8.3±0.1 inch to 9.0±0.1 inch depending on whether measurement is at the top side or the bottom side of the arm member with the top side being longer.

The fourth segment 78 of each arm member 56 and 58 extends in the same lateral direction as the first and third segments 68 and 72, and the third bend 80 of each arm member 56 and 58 bends each fourth segment 78 to approximately zero degrees incline, i.e., generally horizontal. For example, the preferred predetermined angle for the third bend is about 35±1° with reference to the angle of incline for the first, second and third segments, and the fourth segment has a length in the range of about 6±0.1 inch to 8±0.1 inch, depending upon whether the measurement is at the top side or bottom side with the top side being longer.

Referring to FIGS. 3, 4 and 5, the coupling 64 spans across and interconnects the fourth segments 78. More specifically, the coupling 64 includes a bottom plate 128 extending between the inner sides 57c of the arm members 56 and 58 adjacent the bottom sides 57d. The bottom plate 128 has a forward end 130 and rearward end 132. The forward end 130 extends between and interconnects a portion of the third segments 72 of the arm members 56 and 58.

The forward and rearward ends 130 and 132 of the bottom plate 128 include a downward turned skirt portion 134 and 136, respectively, to provide rigidity and prevent twisting at the coupling 64.

Figure 10:
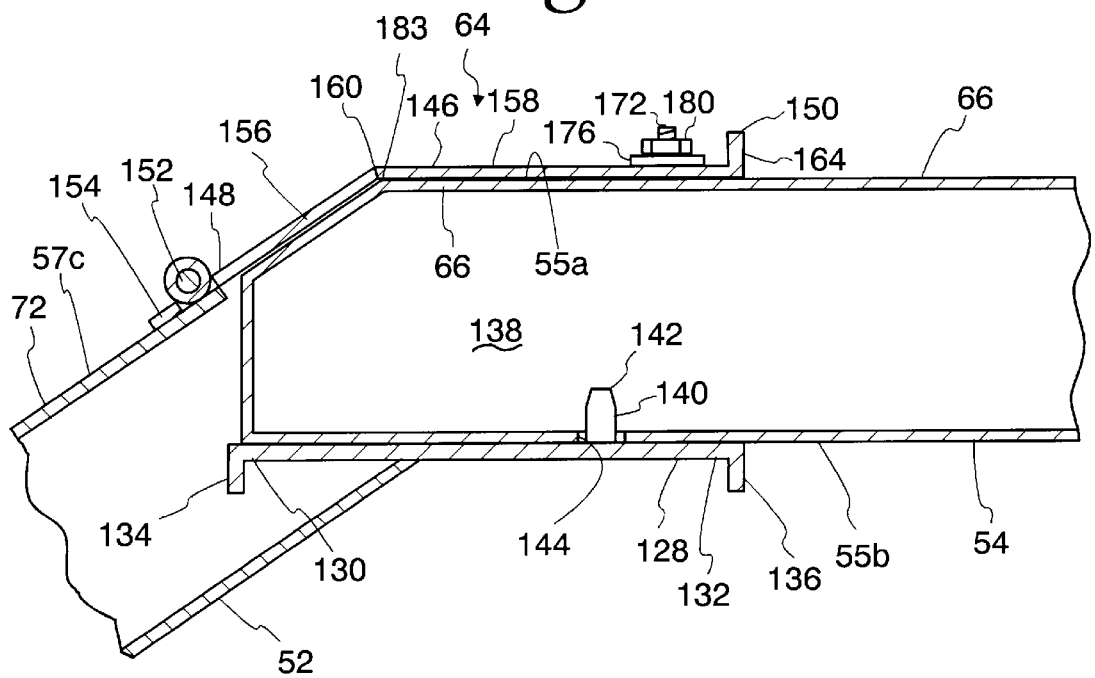
FIG. 10 is a partial cross-sectional view of the front and rear arms of the inter-plant arm of FIG. 3 to illustrate the coupling between the front and rear arms.

The bottom plate 128 and the inner sides 57c of the fourth segments 78 and a portion of the third segments along the bottom plate 128 define a cavity 138 designed to receive the insert portion 66 of the rear arm 54 (FIG. 10). As previously mentioned, the clearance between the inner sides 57c and the insert portion 66 is minimal so that, when the insert portion 66 is positioned in the cavity 138, the rear arm 54 is not able to rotate and wobble beyond that tolerated for planting accuracy. The clearance, however, is designed to easily insert and remove the insert portion 66 of the rear arm 54 from the cavity 138 for quick and efficient attachment and detachment of additional planter units 24. For instance, the preferred clearance is about 0.125±0.05 inch on each side of the insert portion of the rear arm. The stud transmits pulling forces from the multi-row planter to the additional planter units.

Referring to FIGS. 4 and 10, the bottom plate 128 includes a stud 140 extending vertically into the cavity 138. The stud 140 is located at a center location between the inner surfaces 57c of the fourth segments 78 of the arm members 56 and 58 in the transverse direction and slightly forward of the central position along the fourth segments 78 in the longitudinal direction. The stud 140 includes a tapered or domed tip 142 designed for insertion into a bore 144 formed in the bottom side 55b of the rear arm 54 at the insert portion 66. The stud 140 aligns the insert portion 66 of the rear arm 54 in the cavity 138 of the coupling 64 and prevents the rear arm 54 from being removed from the cavity 138 when locked by the coupling 64.

Referring to FIGS. 4, 5 and 10, the coupling 64 also includes a latch cover 146 pivotally mounted to the top side 57c of each third segment 72 of the arm members 56 and 58. More specifically, the latch cover 146 includes a pivot mounting edge 148 and an opposite free edge 150. A hinge 152 spans across the gap between the third segments 72 and is mounted to the top side 57a of the third segments 72. A mounting plate 154 also extends across the gap forward of the hinge 152 for positioning and securing the hinge 152 and for providing additional rigidity. The latch cover 146 is mounted to the hinge 152 with its pivot mounting edge 148 and is pivotable about the hinge 152 between an open position to expose the cavity 138 for placing the insertion portion 66 of the rear arm 54 in the cavity 138 and a closed position in which the latch cover 146 engages the top sides 57a of the fourth segment 78 and a portion of the third segment 72 and extends between the arm members 56 and 58 to engage the top side 55a of the insert portion 66. The cavity 138 includes a tubular cross-section that prevents the insert portion 66 from rotating during planting.

The latch cover 146 is divided into forward and rearward generally planar rectangular portions 156 and 158, respectively. The two portions 156 and 158 are separated by a transverse bend 160, which disposes the two portions 156 and 158 at generally the same predetermined angle as that between the third and fourth segments 72 and 78 of the arm members 56 and 58. In the closed position, the latch cover 146 closes the cavity 138 to prevent the insert portion 66 of the rear arm 54 from releasing from the cavity 138. The latch door 146 also includes skirt portions 162 depending downward from the forward and rearward portions 156 and 158 to engage the outer sides 57d of the third and fourth segments 72 and 78 of each of the arm members 56 and 58 when the latch cover 146 is in the closed position. The latch cover 146 also includes an upstanding skirt portion 164 across the free edge 150. The skirt portions 162 align the latch door 146 and add rigidity and durability to the coupling 64 and reduce twisting of the coupling 64 during planting operations.

Referring to FIGS. 4 and 5, the coupling 64 includes a latch in the form of a T-bolt 166 on each side to lock and unlock the latch cover 146. The bolts 166 are pivotally mounted in a pair of brackets 168a and 168b extending from each of the outer sides 57d at the fourth segments 78 of the arm members 56 and 58 adjacent the receiving ends 62. More specifically, each bolt 166 includes a hinge pin portion 170 that is mounted into the brackets 168a and 168b and allows a perpendicular threaded portion 172 of the bolt 166 to be pivoted between a latched position in which the latch cover 146 is locked in the closed position and an unlatched position in which the latch cover 146 is unlocked and free to be opened for inserting and removing the insert portion 66 of the rear arm.

To lock the latch cover 146 in the closed position, the threaded portion 172 of each bolt 166 extends through an arcuate notch 174 formed at that terminal ends of a rectangular latch plate 176 that extends across the rearward portion 158 of the latch door 146 adjacent the free edge 150. The notches 174 extend out beyond the side skirt portions 162 of the latch cover 146 and are supported from underneath by a pair of vertical extending tabs 178a and 178b. The tabs 178a and 178b are mounted to the side skirt portions 162 and are spaced to allow the threaded portion 172 of the bolt 166 to extend between them without obstruction. A nut 180 is tightened on the threaded portion 172 above each notch 174 to lock the latch cover 146 in the closed position and loosened to allow the latch cover 146 to be set to the open position.

Referring to FIGS. 6 and 7, the rear arm 54 is segmented into a first segment 182, second segment 184 and third segment 186. The insert portion 66 includes the entire first segment 182 and a portion of the second segment 184. The second and third segments 184 and 186 are separated by a vertical bend 188. The third segment 186 is designed to carry either an individual additional planter unit 24 (FIG. 3) or an additional tool bar 34 (FIG. 11).

Referring to FIG. 10, the top side 55a at the first segment 182 of the rear arm 54 is tapered downward at an angle generally matching that of the forward portion 156 of the latch cover 146. To interconnect the rear arm 54 with the front arm 52, the insert portion 66 is lowered into the cavity 138 with the first segment 182 residing between the inner sides 57c of the third segments 72 of the arm members 56 and 58 to be engaged by the forward portion 156 of the latch cover 146 when in the closed position. Thus, the bend 160 of the latch cover 146 is designed to match up with the edge 183 of the top side 55a between the first and second segments 182 and 184 of the rear arm 54. The length of the first and second segments combined is about 19.00±0.25 inches along the bottom side 55b. Also, the first portion of the second segment 184 of the rear arm 54 is located between the inner sides 57c of the fourth segments 78 of the arm members 56 and 58. The portion of the second segment 184 in the cavity 138 is to be engaged at its top side 55a by the rearward portion 158 of the latch cover 146 when in the closed position. To lock the coupling 64, the latch cover 146 is closed and the T-bolts 166 are rotated into the notches 178 and secured by the nuts 180.

When the coupling is locked, the latch cover 146 and the stud 142 and bore 144 interconnection prevent the rear arm 54 from becoming both detached and rotating during planting. Further, the combination of the tapered insert portion 66 and the angled latch cover 146 provide additional stability at the coupling 64 for planting accuracy.

To detach the rear arm 54, the latch cover 146 is unlatched by loosening the nuts 180 and pivoting the T-bolts 166 from the notches 174. The latch cover 146 is then opened and the insert portion 66 is lifted out from the cavity 138.

Referring to FIG. 12, an alternative coupling 216 may also be used to secure a modified insert portion 232 of a rear arm 218. The coupling 216 defines a cavity 220 between the inner sides 57c of the fourth segments with a bottom plate 222 and a fixed cover plate 224. The cavity 220 has the same shape as cavity 138 and prevents rotation during planting. Thus, the bottom plate 222 and the cover plate 224 are identical to the bottom plate 128 and latch plate 146, respectively, with the exception that the insert portion 232 is locked in place in the cavity 222 with a single pin 226 extending through the cover plate 224, a top side 228 and a bottom side 230 of the insert portion 232 of the arm 218. The pin 226 and the bottom plate 222 includes a head 234 that engages the cover plate 224 and a tapered and domed insert 236 for insertion through bores 238, 240, 242 and 244 formed through the cover plate 224, the top and bottom sides 228 and 230 of the insert portion 232 and the bottom plate 222, respectively. To lock the rear arm 218, the insert portion 232 is slid into the cavity 216. Once installed in the cavity 216, the bores 238, 240, 242 and 244 are in alignment and the pin 226 is inserted into place to prevent removal of the insert portion 232 from the cavity 220 and to transmit pulling forces from the multi-row planter to the additional planter units. To disconnect, the pin 226 is removed and the insert portion 232 is removed from the cavity 218.

Referring to FIGS. 6 and 7, the vertical bend 188 turns the rear arm 54 downward at a predetermined angle to position a carrying end 190 at a predetermined vertical height, which is approximately that height necessary to mount an additional conventional planter unit 24 (FIG. 3) and/or that matching the general vertical height of the planter tool bars 14, 20 and 22. The predetermined angle of the bend 188 and the length of the third segment 186 are coordinate to achieve the predetermined vertical height without unduly lengthening the inter-plant arm 30. For instance, the preferred angle of the rear arm bend is about 35±1° from the horizontal, and the preferred length of the second segment is in the range of about 25.5±0.2 inch to 27.0±0.2 inch, depending on whether the measurement is taken along the top side or the bottom side.

The third segment 186 of the rear arm 54 terminates with the carrying end 190 adapted to mount either an additional individual planter unit 24 (FIG. 3) or the additional tool bar 34 (FIG. 11). More specifically, referring to FIGS. 3, 6 and 7, to mount an individual additional planter unit 24, the carrying end 190 is fitted with a mounting plate 192 to which is affixed a tubular support bar 194. The tubular support bar 194 has a square cross-section and is capable of having an additional planter unit 24 mounted to it in a conventional manner. The planter unit 24 remains mounted to the rear arm 54, which is attached and detached from the front arm member 52 to vary the number of additional planter units. The tubular support bar 194 may be affixed to the mounting plate 192 in any suitable fashion, such as being welded directly to the mounting plate 192. When mounting additional individual planter units, there is an inter-plant bracket associated with each additional planter unit.

Referring to FIGS. 1, 2 and 11, the carrying end 190 is alternatively mounted directly to an additional tool bar 34.

More specifically, the carrying end 190 of a number of rear arms 52 is welded directly to the additional tool bar 34 or is fitted with a bracket that allows the carrying end 190 to be bolted to the additional tool bar. As illustrated, four rear arms 54 are used to support the additional tool bar 34, which in turn is carrying seven additional planter units 24 that are mounted in a conventional manner. For instance, two sets of bolts 196 and 198 may cooperate with a planter mounting bracket 200 to surround and clamp the tool bar 34. Thus, the overall number of inter-plant arms tends to be less than the number of additional planter units carried by the additional tool bar.

Referring to FIG. 11, the additional planter units 24 are conventional planter units and include a chain and sprocket drive system 202 for operating the planter unit 24. In order to accommodate the distance between a main drive shaft and sprocket (not shown) at the main or wing tool bars and the additional extension to the drive system 202 at the planter unit due to the inter-plant arm 30, an extended chain 204 is employed to reach the drive system 202 on the planter unit.

As mentioned above, the wider planters include wing tool bars 20 and 22. The inter-plant arms 30 are capable of mounting the two piece additional wing tool bars 36 and 38 in the same manner as described above for the additional main tool bar 34. As illustrated, the additional wing tool bars 36 and 38 are capable of carrying more additional planter units 26 and 28, respectively, per inter-plant arms 30 and are pivotable to position the additional planter units 26 and 28 for transport.

Referring to FIG. 13, as an alternative to the additional wing tool bars 36 and 38, an extended main additional tool bar 34a is employed to carry at least two more additional planter units 24 for a total of nine units. One or more additional inter-plant arms 30 is used to support the extended main tool bars 34a. At each of the wing tool bars 20 and 22, a pair of additional planter units 26 and 28, respectively, are mounted with separate inter-plant arms 30. The carrying end 190 of the rear arm 54 may be fitted with a pivotable support bar 206 in order to pivot one of the additional planter units 26 and 28 on each side of the planter 10a into the space between the wing tool bar 20 and 22 and the main tool bar 14 and the other way for the other additional planter units 26 and 28 to be positioned in front of the wing tool bar 20 and 22. Thus, in the transport configuration, the pair of additional planter units 26 and 28 are pivoted in opposite directions.

A hinge 208 mounted on one side of the rear arm 52 at the carrying end 190 pivotally mounts the planter support bar 206. On the other side of the rear arm 52, a latch 210 is provided to maintain the planter unit in position during planting. The desired direction of pivoting determines which side of the rear arm 52 the hinge 208 is located. The latch 210 may be similar to the hinge 208 but includes a removable hinge pin 212. Any other desired configuration and combination of inter-plant arms and additional tool bars may be employed under the present invention.

It will be understood that various changes in the detail, materials and arrangement of parts and assemblies which have been herein described and illustrated in order to explain the nature of the present invention may be made by those skilled in the art within the principle and scope of the present invention as expressed in the appended claims.

What is claimed is:

1. A quick connect and disconnect coupling for adding additional planter units to a multi-row planter comprising:
   a receiver tube;
   a telescoping tube inserted into the receiver tube;
   the tubes having engaged walls to prevent rotation of at least one additional planter unit attached to a multi-row planter; and
   a coupling device at the tubes to transmit pulling forces from a multi-row planter to at least one additional planter unit.

2. The quick connect and disconnect coupling in accordance with claim 1 wherein the coupling device includes a pin interconnecting the tubes to transmit pulling forces from a multi-row planter to at least one additional planter unit.

3. The quick connect and disconnect coupling in accordance with claim 2 wherein the receiver tube includes a cover removable to a receiving position to allow insertion of the telescoping tube into the receiver tube.

4. The quick connect and disconnect coupling in accordance with claim 3 wherein the cover exposes the coupling device in the receiving position to allow insertion of the telescoping tube into the receiver tube.

5. The quick connect and disconnect coupling in accordance with claim 4 wherein the cover is pivotally mounted to the receiver tube to pivot open to the receiving position to expose the coupling device to allow insertion of the telescoping tube into the receiver tube and to pivot closed to a lock position to prevent removal of the telescoping tube from the receiver tube with the coupling device.

6. A bracket assembly for facilitating efficient varying of planting row widths in a multi-row planter having a plurality of existing planter units by selectively mounting a predetermined number of additional planter units, the bracket assembly comprising:
   a first arm having a first end capable of being mounted to a multi-row planter adjacent an existing planter unit and a second end opposite the first end;
   a second arm having a first end for carrying at least one additional planter unit and a second end for connection to the second end of the first arm; and
   a coupling to selectively connect and disconnect the second ends of the first and second arms, the coupling being carried by one of the second ends of the first and second arms and defining a receiver for receiving the other of the second ends of the first and second arms therein, the coupling having a lock selectively shiftable between a lock position in which the other of the second ends of the first and second arms is secured in the receiver and an unlock position in which the other of the second ends of the first and second arms is free to be removed from the receiver.

7. The bracket assembly in accordance with claim 6 wherein the lock further comprises a pin selectively extending between the receiver and the other of the second ends of the first and second arms to prevent release from the receiver when the lock is in the lock position and the pin selectively removable from the other of the second ends of the first and second arms to release the other of the second ends of the first and second arms from the receiver when the lock is in the unlock position.

8. The bracket assembly in accordance with claim 7 wherein the lock further comprises a latch selectively shiftable between a closed position in which the latch defines in part the receiver and prevents the pin from being removed from the other of the second ends of the first and second arms when the lock is in the lock position and an opened position in which the pin is selectively removable from the other of the second ends of the first and second arms to release the other of the second ends of the first and second arms from the receiver when the lock is in the unlock position.

9. The bracket assembly in accordance with claim 8 wherein the first end of the first arm is capable of being mounted to a multi-row planter at a predetermined angle of incline to locate the second end of the first arm above the first end of the first arm and to locate the coupling between the second ends of the first and second arms above the first end of the first arm.

10. The bracket assembly in accordance with claim 9 wherein the coupling is carried by the second end of the first arm and the receiver is adapted to accept the second end of the second arm to connect the first and second arms.

11. The bracket assembly in accordance with claim 10 wherein the first arm further comprises a left arm member and a right arm member, the left and right arm members merge together to form in part the receiver of the coupling.

12. The bracket assembly in accordance with claim 11 wherein the left and right arm members of the first arm include a plurality of bends to merge the arm members together at the coupling and to alter the predetermined angle of incline of the first arm for the coupling.

13. The bracket assembly in accordance with claim 12 wherein the coupling includes a base extending between the left and right arm members to define in part the receiver along with the left and right arm members at the coupling.

14. The bracket assembly in accordance with claim 13 wherein the latch of the lock includes a cover extending between the left and right arm members to define in part the receiver along with the base and the left and right arm members at the coupling, the cover being pivotally mounted to the left and right arm members to be selectively pivoted between the closed position of the latch to prevent the second end of the second arm from releasing from the receiver when the lock is in the lock position and to the opened position of the latch to allow the second end of the second arm to be removed from the receiver when the lock is in the unlock position.

15. The bracket assembly in accordance with claim 14 wherein the pin extends from the base into the receiver and the second end of the second arm defines a pin aperture to receive the pin when the second end is located in the receiver.

16. The bracket assembly in accordance with claim 15 wherein the cover in the open position of the latch allows the second end of the second arm to be located in the receiver so that the pin inserts in the pin aperture and in the closed position of the latch the lock prevents the cover from being pivoted to prevent the second end of the second arm from disengaging the pin and releasing from the receiver.

17. The bracket assembly in accordance with claim 16 wherein the first end of the second arm includes a mounting member to attach at least one additional planter unit.

18. The bracket assembly in accordance with claim 17 wherein the mounting member includes a hinge mount with the first end of the second arm to allow the mounting member to pivot between a planting position and a transport position.

19. The bracket assembly in accordance with claim 18 wherein the mounting member further includes a catch to selectively secure the mounting member to the planting position and to selectively release the mounting member to the transport position.

20. A bracket assembly for facilitating efficient varying of planting row widths in a multi-row planter having a plurality of existing planter units by selectively mounting a plurality of additional planter units, the bracket assembly comprising:

a plurality of first arms each having a first end capable of being mounted to a multi-row planter adjacent an existing planter unit and a second end opposite the first end;

a tool bar capable of carrying a plurality of additional planter units;

a plurality of second arms each having a first end for attachment to the tool bar and a second end for selective connection to the second end of the first arms; and a plurality of couplings to selectively connect and disconnect the second ends of the first and second arms, each of the couplings being carried by the second end of each of the first arms and defining a receiver for each receiving one of the second ends of the second arms therein, each of the couplings having a lock selectively shiftable between a lock position in which the second ends of the second arms are secured in the receivers and an unlock position in which the second ends of the second arms are free to be removed from the receivers.

21. The bracket assembly in accordance with claim 20 wherein the tool bar comprises a first bar and a second bar, a hinge pivotally connecting the first and second bars, the first bar being attached to the first ends of the second arms and the second bar carrying a plurality of additional planter units, the second bar being pivotable between a planting position along the first bar and a transport position spaced from the first bar.

22. The bracket assembly in accordance with claim 21 wherein each of the first arms comprise a left arm member and a right arm member, the left and right arm members merge together to form in part the receiver at each of the couplings.

23. The bracket assembly in accordance with claim 22 wherein each of the couplings include a base extending between the left and right arm members to define in part the receiver along with the left and right arm members at the coupling.

24. The bracket assembly in accordance with claim 23 wherein each of the locks include a cover extending between each of the left and right arm members to define in part the receiver along with the base and left and right arm members at each of the couplings, the cover being pivotally mounted to the left and right arm members to be selectively pivoted between a closed position to prevent the second end of the second arm from releasing from the receiver when the lock is in the lock position and to the opened position to allow the second end of the second arm to be removed from the receiver when the lock is in the unlock position, and having a latch to secure the cover in the closed position when the lock is in the lock position.

* * * * *